United States Patent [19]

Balser

[11] 3,775,756

[45] Nov. 27, 1973

[54] PROGRAMMABLE SPECIAL PURPOSE PROCESSOR HAVING SIMULTANEOUS EXECUTION AND INSTRUCTION AND DATA ACCESS

[75] Inventor: Charles B. Balser, New Hartford, N.Y.

[73] Assignee: General Electric Company, Utica, N.Y.

[22] Filed: July 20, 1972

[21] Appl. No.: 273,575

[52] U.S. Cl. .............................................. 340/172.5
[51] Int. Cl. .............................................. G06f 9/06
[58] Field of Search .................................. 340/172.5

[56] References Cited

UNITED STATES PATENTS

| | | | |
|---|---|---|---|
| 3,537,072 | 10/1970 | Macon et al. | 340/172.5 |
| 3,623,158 | 11/1971 | Llewelyn et al. | 340/172.5 |
| 3,629,853 | 12/1971 | Newton | 340/172.5 |
| 3,344,404 | 9/1967 | Curewitz | 340/172.5 |
| 3,404,378 | 10/1968 | Threadgold et al | 340/172.5 |
| 3,431,558 | 3/1969 | Capozzi | 340/172.5 |
| 3,470,540 | 9/1969 | Levy | 340/172.5 |
| 3,599,176 | 8/1971 | Cordero, Jr. et al. | 340/172.5 |

*Primary Examiner*—Paul J. Henon
*Assistant Examiner*—Melvin B. Chapnick
*Attorney*—Robert P. Cogan et al.

[57] ABSTRACT

In a programmable special purpose processor for an input/output controller, data and data moving instructions are respectively stored in data and instruction memories rather than in one memory. While a data word is accessed from a data register to an arithmetic unit in response to a data moving instruction, an instruction counter is updated to direct the subsequent instruction to be delivered to an instruction register to prepare the processor to perform its next data moving operation. At the same time, in response to a data memory address register, a next data word is accessed from a data memory to the data register. At the beginning of the next cycle, the processor is prepared to execute the next instruction. Consequently, the processor operating speed is increased since data words and instructions need not be sequentially accessed during a cycle.

7 Claims, 1 Drawing Figure

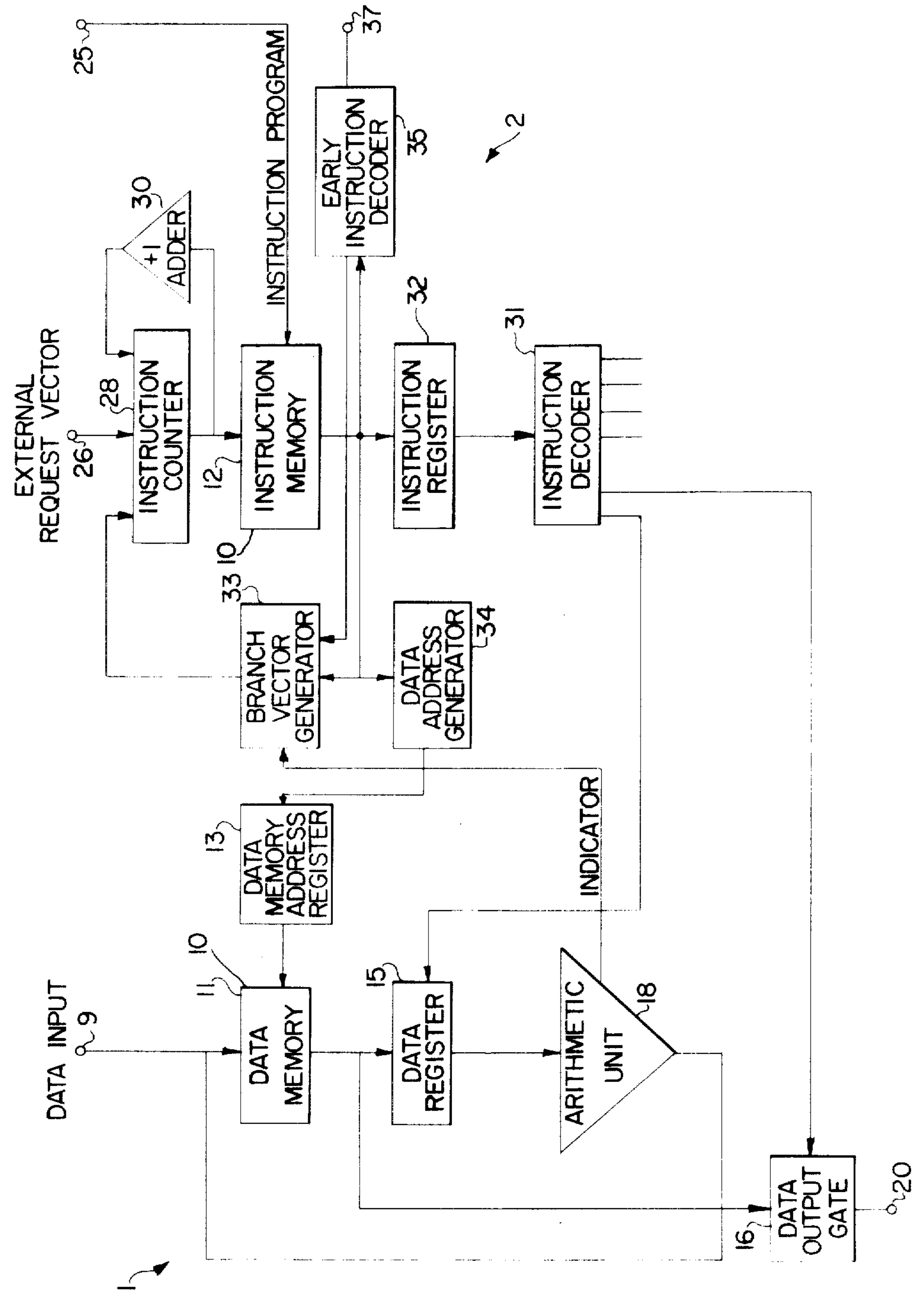
EXTERNAL REQUEST VECTOR
INSTRUCTION COUNTER
INSTRUCTION MEMORY
INSTRUCTION PROGRAM
+1 ADDER
EARLY INSTRUCTION DECODER
INSTRUCTION REGISTER
INSTRUCTION DECODER
BRANCH VECTOR GENERATOR
DATA ADDRESS GENERATOR
DATA MEMORY ADDRESS REGISTER
INDICATOR
DATA INPUT
DATA MEMORY
DATA REGISTER
ARITHMETIC UNIT
DATA OUTPUT GATE

PROGRAMMABLE SPECIAL PURPOSE PROCESSOR HAVING SIMULTANEOUS EXECUTION AND INSTRUCTION AND DATA ACCESS

BACKGROUND OF THE INVENTION

This invention relates to special purpose processors and more particularly to timing, control and data path circuitry therein.

The special purpose processor comprising the present invention is of the type used for the pre or post high speed processing of information generated by or for a general purpose computer. The present invention particularly contemplates an improvement over the well-known real time input/output controller. In the past, processors of this type were "hard wired" programmed to perform their specific tasks. The data moving instructions, which are analogous to control circuitry in "hard wired" circuitry, were contained in the wired circuitry. Such processors utilize a single core memory for storage of data. The hard wire control provides speed because data moving instructions are already wired, and at the beginning of each operating cycle, only data need be accessed from the memory. However, changes in system design due to debugging, additions, revisions, and the like, are more difficult and more costly to perform with a hard wire programmed processor than with a programmable processor. In a programmable processor, data moving instructions must be stored in a memory. In processors of this type, data moving instructions are stored in the same memory as data, since separate memories have not been provided. Where core memories are used, the cost of a multiple core memory is prohibitive. However, processor speed of operation is slowed because data moving instructions and data must be separately accessed during each cycle. For simplicity in explanation, data moving instructions are hereinafter referred to as instructions.

SUMMARY OF THE INVENTION

It is, therefore, an object of the present invention to provide a timing control and data path circuit in a special purpose processor in an input/output controller embodying the speed of a "hard wired" processor and the flexibility of a programmable processor.

It is a more specific object of the present invention to provide a timing control and data path circuit of the type described utilizing a dual or split memory, including one memory for data and another for instructions.

It is also an object of the present invention to provide a timing, control and data path circuit of the type described in which a subsequent instruction is accessed from memory while a first instruction is being executed.

Briefly stated, there is provided in accordance with the present invention a timing, control and data path circuit in a special purpose processor wherein a split memory is utilized having a first portion for containing data and a second portion for containing instructions. A data register is provided having its input connected to the data memory and its output connected to an arithmetic unit. An instruction register is provided having its input connected to the instruction memory and its output connected to an instruction decoder. In response to a signal from an instruction counter from a previous cycle, the instruction decoder enables the data register or external unit to access the data memory. A "plus one" adder, external request vector, or branch vector, is connected to an instruction counter to provide an instruction address to the instruction memory so that the instruction memory drives the instruction register, and the processor is prepared to execute the subsequent instruction on a subsequent data word at the beginning of the next cycle.

BRIEF DESCRIPTION OF THE DRAWINGS

The means by which the foregoing objects and features of novelty are achieved are pointed out with particularity in the claims forming the concluding portion of the specification. The invention, both as to its operation and manner of organization may be further understood by reference to the following description taken in connection with the drawing. The FIGURE is a block diagramatic presentation of a timing control and data path circuit constructed in accordance with the present invention.

DESCRIPTION OF THE PREFERRED EMBODIMENT

Referring now to the FIGURE, there is illustrated a timing control and data path circuit consisting of data means 1 and instruction means 2 for connection to well-known input/output circuits of an input/output controller and well-known device interface control circuits in order to comprise a special purpose processor. The contruction and operation of a real time input/output controller for which the present invention is suited, is described in Real Time Input/Output Controller Reference Manual (No. 66J 013, General Electric Company, Syracuse, New York, November 1966). A dual memory 10 is provided, including a data memory 11 and an instruction 12. The memory 10 may comprise, for example, a well-known semiconductor memory, such as the Intersil IM 5533D 256 bit random access memory, or the AMI AM 3101 64 bit memory. Data is coupled from a data input terminal 9 to the data memory 11. The data input may consist of digital words indicative of such parameters as transducer outputs or may comprise a computer output. By well-known means, words are written into various locations of the data memory 11. A data memory address register 13 is connected to address the data memory 11 for selecting a word to be operated upon during execution of an instruction. The output of the data memory 11 is connected to a data register 15 and a data output gate 16 having an output terminal 20. The data register 15 stores a current word for a current cycle. The output terminal 20 couples an output to the input/output circuits and/or device interface control circuits when the data output gate 16 is gated. The data register 15 is connected to an arithmetic unit 18 which performs calculations on data words in accordance with a program preferably for post processing. The output of the arithmetic unit 18 is connected to the input of the data memory 11 for storing updated data. For preprocessing, an arithmetic unit (not shown) is preferably connected between the data input terminal 9 and the data memory 11.

Instructions are provided to various locations of the instruction memory 12 in accordance with an input connected thereto from a program input terminal 25. The input terminal 25 is preferably coupled to a general purpose computer. The instructions are performed in response to a signal called an external request vector provided at an input terminal 26. The external request vector is an external instruction address generated by functional vector generating hardware and is provided from the well-known input/output circuit (not shown). The terminal 26 is connected to an instruction counter 28 having outputs connected to the instruction memory 12 and a "plus one" adder 30. The output of the adder 30 is connected to a further input of the instruction counter 28. An instruction register 32 has an input connected to the output of the instruction memory 12 and an output connected to an instruction decoder 31. The instruction memory 12 also is coupled to provide outputs to a branch vector generator 33, which, when enabled, provides a branch address input to the instruction counter 28. A branch vector is an address corresponding to an instruction out of the sequence of the program. Indicator inputs are coupled from the arithmetic unit 18 to the branch vector generator 33. Consequently, if the result of a calculation indicates that an out-of-sequence program instruction is needed, in accordance with the circuit program the branch vector generator 33 is enabled. External inputs (not shown) may also be connected to the branch vector generator 33.

Also, the instruction memory 12 is coupled to provide an output to an early instruction decoder 35, which is coupled to provide control to the branch vector generator 33 in response to an appropriate instruction. The early instruction decoder 35 may provide an output at a terminal 37 for synchronizing external peripheral circuitry. A data address generator 34 is coupled to the output of the instruction memory 12 and provides a data address vector to the data memory address register 13 for both reading and storage operations. The instruction decoder 31 provides control outputs to the data memory address register 13, data register 15, data output gate 16, and to conventional components (not shown).

OPERATION OF THE CIRCUIT

The timing control and data path circuit operates with the data memory 11 and instruction memory 12 cycling simultaneously. Each operating cycle consists of an overlapping instruction cycle and data execution cycle. Conventional clock means (not shown) synchronize operation of the circuit. Thus, the data means 1 is executing a current instruction while the instruction channel 2 is preparing a next instruction. At the beginning of an operating cycle, a current instruction is provided to the instruction decoder 31 from the instruction register 32, which is strobed by conventional clock means (not shown). The instruction decoder 31 enables the data register 15, which is loaded by the data memory 11 in response to a clock signal, to couple a word to the arithmetic unit 18. The current instruction is thus executed. (Alternatively, the word from the data memory 11 may be gated through the data output gate 16). Also, at the beginning of a cycle, the circuit is prepared for the next cycle. The instruction counter 28 addresses the instruction memory 12 to select the proper instruction from the program to be executed as the next instruction. The output, or contents, of the instruction memory 12 is decoded by the early instruction decoder 35. The early instruction decoder 35 determines if the next instruction is a branch instruction, i.e., an instruction for program jump, i.e., for selecting a program instruction out-of-sequence, or an output instruction. If the next instruction is a branch instruction, the early instruction decoder 35 provides a time delay to allow an indicator to propagate through the arithmetic unit 18 and branch vector generator 33 for branch instruction and for I/0 device response for output instruction. In a typical embodiment, a standard instruction cycle may take 200 nanoseconds, while a branch or output instruction may be designed to take 300 nanoseconds.

The instruction memory 12 also provides an output to the data memory address generator 34. The data memory address generator 34 provides an address to the data memory address register 13 indicative of the location of the next word to be provided from the data memory 11. Thus, while executing a current instruction and providing current data from the data memory 11, the timing control and data path circuit of the present invention selects the next data word and is prepared to execute the next instruction.

At the end of a current instruction cycle, the next instruction operation (OP) code is strobed, or loaded into the instruction register 32. The contents of the instruction register 32 are decoded by the instruction decoder 31 which provides control indicative of the next instruction.

Also, at the end of the current instruction execution cycle, the output of the data address generator 34, in response to clock circuitry, is strobed, or loaded into the data memory address register 13 which selects the next data word in the data memory 11 to be operated upon. Also, at the end of the current instruction cycle, the instruction counter 28 is addressed with a digital word indicative of IC +1 from the plus one adder 30, where IC is a digital word indicative of the address of the current instruction in the instruction memory, and IC +1 is a digital word indicative of the address of the next instruction in the instruction memory 12. However, if the next instruction is a non-conditional branch or a conditional branch whose condition is met, the branch vector is addressed into the instruction counter 28 from the branch vector generator 33.

At the end of the same current execution cycle, the data register 15 is loaded with the data word operand which was addressed by the data memory address register 13. The arithmetic unit 18 performs its programmed operation during the subsequent cycle, and the results of the operation can be loaded back into the data memory 11 in response to a later instruction. Alternatively, if commanded by the instruction decoder 31, the data operand from the data memory 11 may be directly outputted through the data gate 16 to the output terminal 20.

Consequently, what is thus provided is a transmission control and data path circuit having approximately the complexity of a uniprocessor, but which is capable of preparing a next instruction while executing a current instruction.

What is claimed as new and desired to be secured by Letters Patent of the United States is:

1. In a special purpose processor, a timing control and data path circuit for operating in synchronism with clocksignals comprising in combination: a data memory, a data register coupled to said data memory for storing a current data word, a data memory address register for storing an address indicative of a next data word stored in said memory and coupled for addressing said data memory, an instruction memory, an instruction counter coupled to address said instruction memory and providing an address indicative of a next instruction of a program, a data address generator coupled to the output of said instruction memory and coupled for providing a data address to said data memory address register indicative of a next data word, an instruction register coupled to said instruction memory for storing a current instruction, and an instruction decoder coupled to said instruction register for enabling said data register to provide the current word, whereby an instruction is executed simultaneously with accessing of a next instruction and a next data word from said instruction memory and said data memory respectively.

2. A timing control and data path circuit according to claim 1 further comprising a plus-one adder coupled from the output of said instruction counter to an input of said instruction counter for updating said instruction counter after said instruction counter provides an address to said instruction memory.

3. A timing control and data path circuit according to claim 1 further comprising an early instruction decoder coupled to the output of said instruction memory and a branch vector generator coupled to the output of said early instruction decoder, said branch vector generator coupled to provide said instruction counter with a branch vector when the next instruction is indicative of a branch instruction.

4. A timing control and data path circuit according to claim 3 further comprising a plus-one adder coupled from the output of said instruction counter to an input of said instruction counter for updating said instruction counter after said instruction counter provides an address to said instruction memory.

5. A timing control and data path circuit according to claim 4 further comprising an arithmetic unit coupled to the output of said data register.

6. A timing control and data path circuit according to claim 5 in which said arithmetic unit is coupled to said branch vector generator for providing an indicator when the computation performed by said arithmetic unit is indicative of a result requiring a branch instruction.

7. A timing control and data path circuit according to claim 5 further comprising a data output gate coupled to said data memory, said data output gate also being coupled for enabling by said instruction decoder.

* * * * *